(12) United States Patent
Tillotson et al.

(10) Patent No.: US 8,798,922 B2
(45) Date of Patent: Aug. 5, 2014

(54) DETERMINATION OF FLIGHT PATH FOR UNMANNED AIRCRAFT IN EVENT OF IN-FLIGHT CONTINGENCY

(71) Applicant: The Boeing Company, Chicago, IL (US)

(72) Inventors: Brian J. Tillotson, Kent, WA (US); Charles B. Spinelli, Bainbridge Island, WA (US); Robert P. Lutter, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 85 days.

(21) Appl. No.: 13/678,919

(22) Filed: Nov. 16, 2012

(65) Prior Publication Data

US 2014/0142787 A1     May 22, 2014

(51) Int. Cl.
 *G01C 21/34* (2006.01)
(52) U.S. Cl.
 USPC ............... 701/469; 701/3; 701/408; 701/474; 701/483; 701/486
(58) Field of Classification Search
 USPC ...................... 701/3, 408, 474, 483, 486, 469
 See application file for complete search history.

(56) References Cited

U.S. PATENT DOCUMENTS

| | | | | |
|---|---|---|---|---|
| 6,882,936 | B2 * | 4/2005 | Desjardins | 701/469 |
| 7,010,262 | B2 * | 3/2006 | Tyson | 455/1 |
| 7,158,877 | B2 * | 1/2007 | Carlsson et al. | 701/2 |
| 7,228,227 | B2 * | 6/2007 | Speer | 701/467 |
| 7,512,462 | B2 * | 3/2009 | Nichols et al. | 701/3 |
| 7,689,328 | B2 | 3/2010 | Spinelli | |
| 7,729,817 | B2 * | 6/2010 | Duranti et al. | 701/11 |
| 8,221,122 | B2 * | 7/2012 | Neely | 434/30 |
| 8,315,794 | B1 * | 11/2012 | Strelow et al. | 701/412 |
| 8,521,343 | B2 * | 8/2013 | Spinelli | 701/17 |
| 8,676,502 | B2 * | 3/2014 | Petersen | 701/483 |
| 2011/0264312 | A1 | 10/2011 | Spinelli et al. | |
| 2014/0025286 | A1 * | 1/2014 | Donovan et al. | 701/408 |

OTHER PUBLICATIONS

Tiwari et al., Mobility Aware Routing for the Airbourne Network Backbone, IEEE 978-1-4244-2677 May 2008.*

* cited by examiner

*Primary Examiner* — Mary Cheung
*Assistant Examiner* — Michael Berns
(74) *Attorney, Agent, or Firm* — Ostrager Chong Flaherty & Broitman P.C.

(57) ABSTRACT

An enhanced control system for an unmanned aerial vehicle adds constraints to the process of choosing a flight path in the event of an in-flight contingency, such as engine out or an encounter with jamming, which forces a diversion or unplanned landing. The constraints are: (1) ensure communications are available when needed during contingency operations; and (2) ensure signals from a global positioning system (or other navigation system) are available when needed during contingency operations.

20 Claims, 5 Drawing Sheets

DETERMINATION OF FLIGHT PATH FOR UNMANNED AIRCRAFT IN EVENT OF IN-FLIGHT CONTINGENCY

BACKGROUND

This disclosure generally relates to systems and methods for choosing a flight path of an aircraft. In particular, this disclosure relates to systems and methods for selecting the flight path of an unmanned aerial vehicle (UAV) in the event of an in-flight contingency.

Small UAVs must have access to communications and navigation signals for some parts of their missions, including landing. Planning for a nominal mission typically includes consideration of where and when these signals are available and where and when they are blocked. Many known software packages support this sort of planning.

Sometimes communication or navigation signals are blocked unexpectedly (e.g., by jamming) or by known factors (e.g., terrain) that only become relevant when some other contingency forces the UAV to depart from the nominal mission path. Examples of these other contingencies include an engine failure or flying an improvised route to pursue a suspect.

To illustrate the foregoing, consider a scenario in which a UAV in a mountainous region may be in line-of-sight to the operator. It is orbiting a surveillance target and staying in the "good communication and navigation" zone defined by pre-mission planning. Then the operator sends the UAV in an unplanned direction to support search and rescue. This takes the UAV behind the mountains, cutting communications at the nominal altitude. In such a situation, it would be undesirable to lose the UAV or abandon the mission.

Larger UAVs and manned aircraft often have redundant systems for communication (e.g., SATCOM) and navigation (e.g., inertial navigation) that enable them to respond to jamming and other contingencies without losing communication and navigation. That is, they have many spectral degrees of freedom. On the other hand, small UAVs typically cannot tolerate the weight, power, and volume needed for such redundant systems; accordingly, small UAVs rely on a single radio and a global positioning system (GPS) receiver. To deal with communication/navigation aspects of in-flight contingencies, such UAVs have few or no spectral degrees of freedom; instead, they must rely on degrees of freedom enabled by flight control.

One solution is manual selection of a path in real-time by the vehicle operator in response to an in-flight contingency. When a contingency requires a forced landing, the vehicle operator looks around (via the UAV's camera or on a map) for potential landing sites, takes his or her best guess as to which sites the aircraft can safely reach in light of the need for communication, picks one of those sites, and attempts to pilot the UAV to that site. Likewise for other deviations from the flight plan: the operator picks a path that he or she guesses will be safe and have adequate communications while accomplishing the mission objective.

Another solution is preprogramming a desired behavior of the UAV. When the UAV loses communication or loses its connection to a GPS signal, it executes a path pre-programmed by its operator prior to flight.

A further solution, for a contingency that requires a forced landing, is to provide a computer program that examines stored information about terrain, weather, aircraft performance characteristics, and terrain features such as airports, roads, power lines, or forests; chooses potential landing sites that can be reached within the performance limits of the aircraft; and either flies the aircraft to one of those sites or displays information to guide a vehicle operator to one of the sites. For flight planning, including ad hoc re-planning, this known solution provides a path from which the UAV can always reach a safe landing site within the kinematic limits of the UAV. This known solution does not consider communication or GPS connectivity constraints.

There is a need for systems and methods capable of assisting a UAV to choose a flight path that maintains access to communication and navigation signals in contingency situations.

SUMMARY

An improved UAV control system is disclosed herein which adds constraints to the process of choosing a flight path in the event of an in-flight contingency, such as engine out or an encounter with jamming, which forces a diversion or unplanned landing. The constraints are: (1) ensure communications are available when needed during contingency operations; and (2) ensure signals from GPS (or other navigation system) are available when needed during contingency operations.

In accordance with various embodiments disclosed herein, the enhanced UAV control system assists a UAV to choose a flight path that maintains access to communication and navigation signals in contingency situations. In accordance with one embodiment, the UAV control system comprises a computer system programmed to (a) detect an in-flight contingency, (b) choose a path that meets requirements for availability of communications and navigation signals while satisfying other constraints, and (c) fly the chosen path. The UAV control system further comprises a digital model of the RF environment that includes the location of the operator's transmitter, characteristics of other transmitters like radio stations or known jammers, the position and orientation of each antenna on the UAV, RF signal polarization, terrain features that may cause multipath fades, etc. The control system further comprises a geometry engine that includes data and functions to analyze how changes in UAV position and orientation affect each antennas' position and orientation relative to the operator's RF signal. The control system further comprises logic for when and how to use the RF environment model and the geometry engine.

The UAV control system in accordance with one embodiment is capable of maintaining access to communication and navigation signals in each of the following contingency scenarios: (1) the UAV has entered a space in which communication and/or navigation signals are suddenly unavailable due to jamming, and the spatial extent of the jamming is unknown; (2) there has been an engine failure (or other flight control failure) and communications are needed shortly before landing, including time to synchronize the communication link before data can be exchanged; and (3) the UAV has been diverted to pursue a new target outside the region covered by pre-mission planning. A respective software module or computer program can be executed to maintain access to communication and navigation signals in response to any one of the foregoing contingencies.

One aspect disclosed hereinafter is a method for controlling an unmanned aerial vehicle in response to an in-flight contingency, comprising the following operations performed by a computer system onboard the unmanned aerial vehicle: (a) determining whether the current flight path of the unmanned aerial vehicle should be changed; (b) determining a different flight path of the unmanned aerial vehicle which satisfies signal reception constraints in response to a determination that the current flight path should be changed; and (c) controlling the unmanned aerial vehicle to fly the different flight path. The signal reception constraints are communication or navigation constraints. In one embodiment, a destination of the different flight path is an emergency landing site. In another embodiment, a destination of the different flight path is a new waypoint not included in a planned mission of the unmanned aerial vehicle. In a further embodiment, step (b) comprises using an RF environment model and a geometry engine to determine a different location for the unmanned aerial vehicle to fly to, the different location being calculated to reduce the effects of jamming. The RF environment model is updated if connectivity to the operator is restored due to the different location.

Another aspect is a method for controlling an unmanned aerial vehicle in response to an in-flight contingency, comprising the following operations performed by a computer system onboard the unmanned aerial vehicle: (a) determining whether signal reception conditions dictate that the current orientation of the unmanned aerial vehicle should be changed; (b) determining a different orientation of the unmanned aerial vehicle which satisfies signal reception constraints in response to a determination that the current orientation should be changed; and (c) controlling the unmanned aerial vehicle to reorient to the selected different orientation. In one embodiment, step (a) comprises: (d) determining whether an onboard receiver is receiving adequate signals; and (e) if the computer system determines in step (d) that the receiver is not receiving adequate signals, determining whether the received power is greater than a predefined threshold. Step (b) may comprise using an RF environment model and a geometry engine to determine the different orientation of the unmanned aerial vehicle, the different orientation being calculated to improve signal reception. The RF environment model is updated if connectivity to the operator is restored due to the different orientation.

In accordance with a further aspect, a method for controlling an unmanned aerial vehicle in response to an in-flight contingency is provided which comprises the following operations performed by a computer system onboard the unmanned aerial vehicle: (a) determining whether a flight-critical component of the unmanned aerial vehicle is operating well enough to continue flight; (b) creating a list of reachable landing sites in response to a determination that the flight-critical component is not operating well enough to continue flight; (c) determining whether at least one path to at least one of the reachable landing sites satisfies signal reception constraints; and (d) controlling the unmanned aerial vehicle to follow the at least one path.

Each of the methods described above can be performed automatically by a system comprising a computer system and computer memory storing an RF environment model, a geometric engine and RF constraint logic.

In accordance with one embodiment, the computer system is programmed to determine a different flight path of the unmanned aerial vehicle which satisfies signal reception constraints using the RF environment model and the geometry engine in response to a determination that the current flight path should be changed.

In accordance with another embodiment, the computer system is programmed to determine a different orientation of the unmanned aerial vehicle which satisfies the signal reception constraints using the RF environment model and the geometry engine in response to a determination that the current orientation should be changed.

In accordance with another embodiment, the computer system is programmed to perform the following operations: determining whether a flight-critical component of the unmanned aerial vehicle is operating well enough to continue flight; creating a list of reachable landing sites in response to a determination that the flight-critical component is not operating well enough to continue flight; determining whether at least one path to at least one of the reachable landing sites satisfies signal reception constraints using the RF environment model and the geometry engine; and controlling the unmanned aerial vehicle to follow the at least one path.

Other aspects of the enhanced control system and method are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
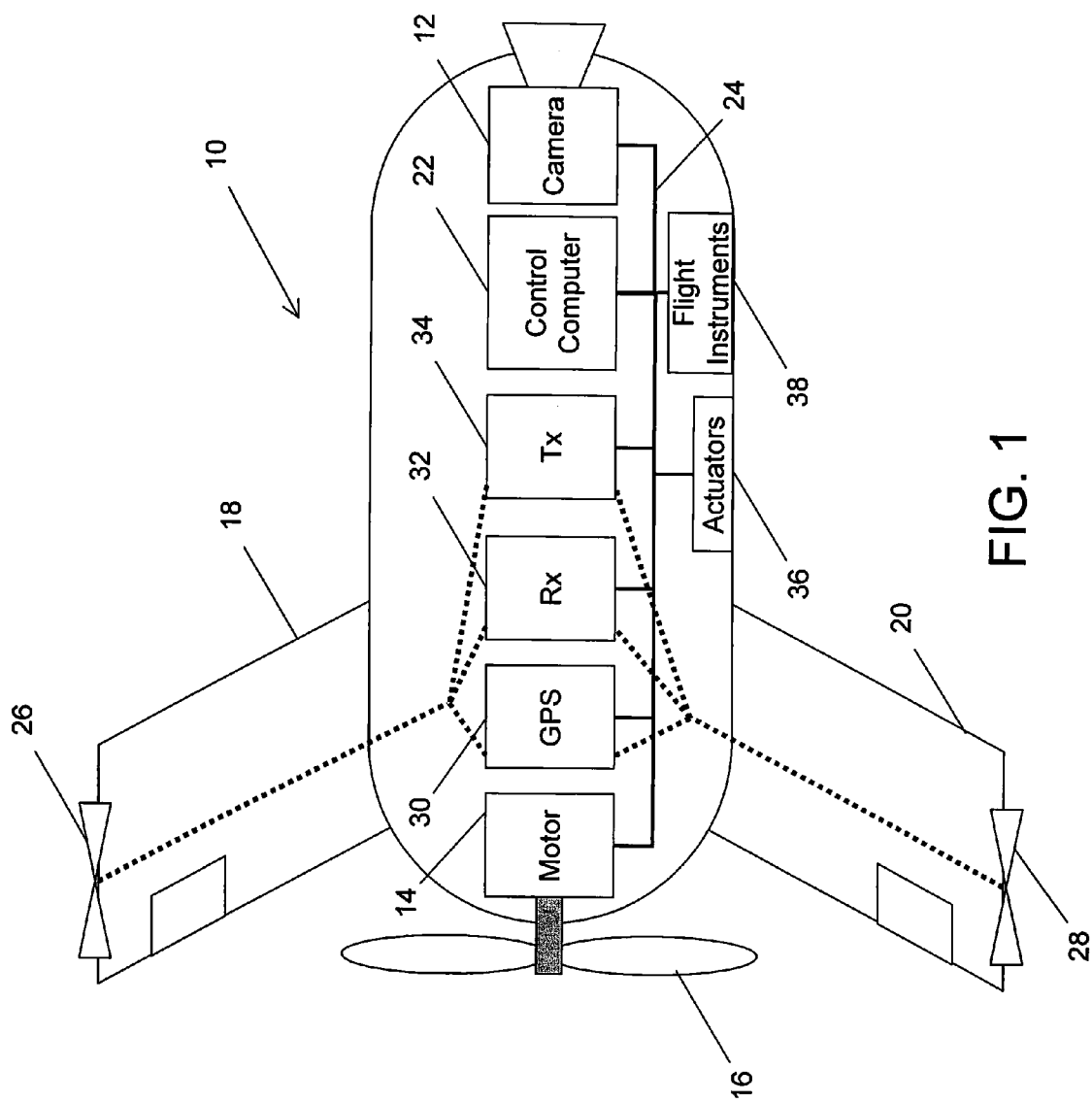
FIG. 1 is a block diagram showing the layout of major subsystems of a typical UAV.

FIG. 1 shows the layout of major subsystems of a UAV 10 of a type which may employ the enhanced control system disclosed herein. UAV 10 has a camera 12 in the front end thereof and a motor 14 in the rear end thereof. The motor 14 drives rotation of a propeller 16. All subsystems communicate with an onboard control computer 22 (hereinafter "controller") via one or more data buses 24. The UAV 10 depicted in FIG. 1 has two antennas 26 and 28 respectively mounted at the tips of wings 18 and 20. Each antenna connects to a GPS receiver 30, a regular radio receiver (Rx) 32, and a radio transmitter (Tx) 34. The UAV further comprises actuators 36 and flight instruments 38 which also communicate with controller 22 via one or more data buses 24.

Figure 2:
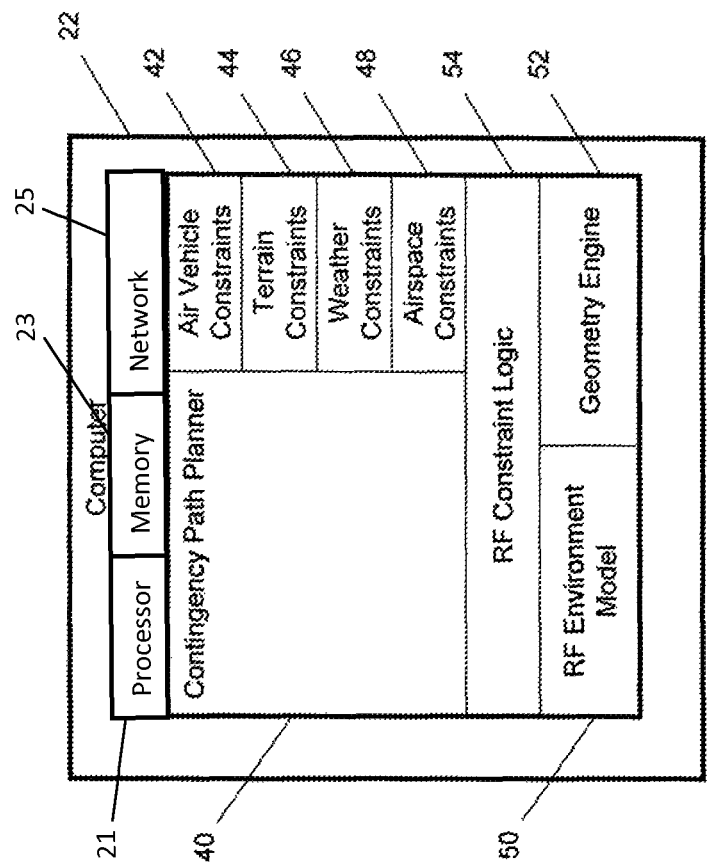
FIG. 2 is a block diagram showing software components of a system, in accordance with one embodiment, for controlling the flight path of a UAV in the event of an in-flight contingency.

FIG. 2 shows hardware and software components of a system, in accordance with one embodiment, for controlling the flight path of a UAV in the event of an in-flight contingency. This software runs on the computer depicted in FIG. 1. Block 21 represents a processor that executes instructions or operations on one or more hardware or software components of the control computer 22 (controller 22). Block 23 represents memory which may be either temporary or permanent storage media including, but not limited to, flash memory, hard-disk, and memory stick. Block 25 represents a network or a communications link that can take the form of, for example, but not limited to one or more wired transmission paths, wi-fi router, fiber optic cables, coaxial cables, infrared, or wireless communication links having one or more paths to communicate signals between one or more hardware or software components and the processor 21 and exchange information, instructions, or operations through one or more data buses 24. Block 40 represents a contingency path planner, which may take the form of a software module in the controller 22. The contingency path planner 40 uses constraints to plan paths during off-nominal operations. Such constraints may include aerial vehicle, terrain, weather and airspace constraints stored in respective databases 42, 44, 46, 48.

The aerial vehicle constraints database 42 contains data indicating factors which limit the performance of the flight vehicle, such as battery life, such as maximum roll rate, maximum bank angle, minimum turning radius, glide speed, etc. The terrain constraints database 44 contains data indicating characteristics of terrain at a landing site, as well as along a flight path to the landing site. The terrain constraints can be used to identify a safe ingress path to a landing site, taking into account terrain, e.g., mountains, hills, canyons, rivers, and the like. The weather constraints database 46 can include data indicating weather information, particularly historical weather information, trends, and the like at the landing site, as well as along a flight path to the landing site. The airspace constraints database 48 contains data indicating airspace that is available for generating one or more flight paths to the landing sites. The airspace constraints could indicate, for example, a military installation or other sensitive area over which the aircraft cannot legally fly.

An enhanced UAV control system in accordance with one embodiment further comprises a digital RF environment model 50, a geometry engine 52, and RF constraint logic 54 which is used to determine when and how to use RF environment model 50 and geometry engine 52. The RF environment model 50 may include the location of the operator's transmitter, characteristics of other transmitters like radio stations or known jammers, the position and orientation of each antenna on the UAV, RF signal polarization, terrain features that may cause multipath fades, etc. The geometry engine 52 includes data and functions to analyze how changes in UAV position and orientation affect each antennas' position and orientation relative to the operator's RF signal. The contingency path planner 40 further comprises logic that includes the RF constraints among the other constraints (described above), for example, during contingency operations.

For example as illustrated in the figures and the text, the computer system may be configured to perform operations in accordance with a first routine of said RF constraint logic including: determining whether a current flight path of the unmanned aerial vehicle should be changed, determining a different flight path of the unmanned aerial vehicle which satisfies signal reception constraints using said RF environment model and the geometry engine in response to a determination that the current flight path should be changed, and controlling the unmanned aerial vehicle to fly a selected different flight path. In yet another example, the computer system may be further capable of performing operations in accordance with a second routine of the RF constraint logic including: determining whether signal reception constraints dictate that a current orientation of the unmanned aerial vehicle should be changed, determining a different orientation of the unmanned aerial vehicle which satisfies said signal reception constraints using said RF environment model and said geometry engine in response to a determination that the current orientation should be changed, and controlling the unmanned aerial vehicle to reorient to a selected different orientation.

Figure 3:
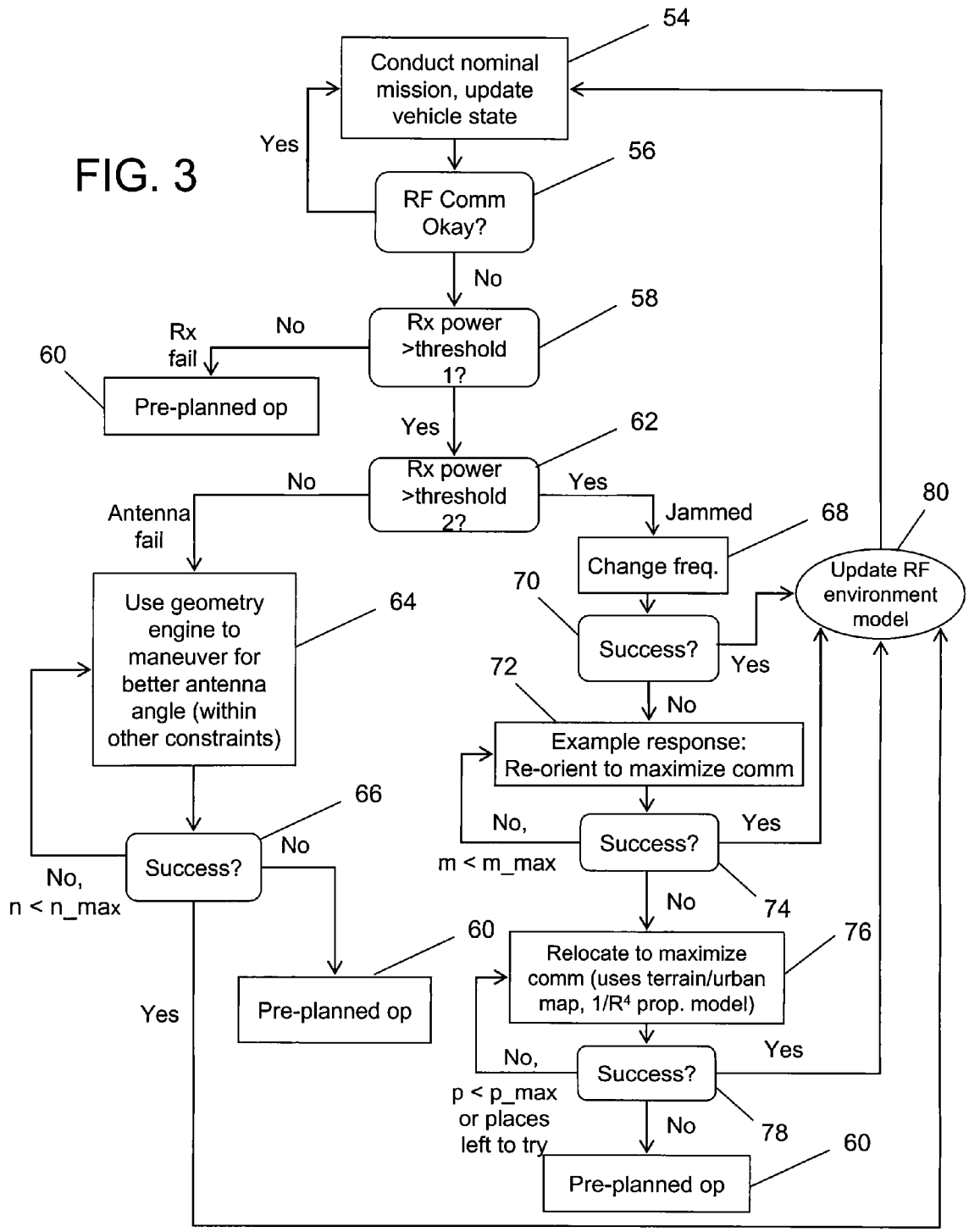
FIG. 3 is a flowchart showing steps of an algorithm for maintaining access to communication and navigation signals in response to jamming or a hardware failure.

FIG. 3 shows steps of an algorithm (executed by the controller) for maintaining access to communication and navigation signals in response to jamming. Blocks 54 and 56 summarize a "preprogrammed behaviors" strategy which is well known in the prior art. The enhanced response to jamming of the system partly depicted in FIG. 2 is more sophisticated than a single pre-planned operation.

In accordance with steps 54 depicted in FIG. 3, the UAV performs nominal mission functions. The onboard control system directs these functions and keeps track of the vehicle state, i.e., location, speed, fuel level, etc. In step 56, the onboard control system checks whether the radio is receiving adequate communication signals, i.e., clear data coming from the receiver. If yes, the control system continues to guide the UAV through its nominal mission. If no, it begins a series of diagnostics and responses.

The first diagnostic step 58 checks whether the received power is greater than a user-selected low threshold, threshold 1. If no, the presumption is that the UAV's receiver has failed. The onboard controller will not be able to fix this, and therefore cannot regain communication with the operator. The controller executes a user-specified preplanned operation (step 60). If yes, the presumption is that the UAV's receiver is still functioning. The controller goes to the next diagnostic step 62.

The second diagnostic step 62 checks whether the received power is greater than a user-selected mid-level threshold, threshold 2 (threshold 2 is greater than threshold 1). If no, the presumption is that the UAV's receiver still works, but at least one of the antennas (or cables from an antenna to the receiver) is damaged. As a result, the receiver is getting a much weaker signal than it should.

In response (step 64), the controller uses its internal digital model of the RF environment and its geometry engine to postulate new positions that might improve RF reception (e.g., by orienting the UAV to point a different antenna toward the operator, or by gaining altitude to establish a clearer path to the operator), and which are achievable within other flight constraints. The number of postulated new positions in a given case is n_max. The controller directs the UAV to fly to each postulated new position and check whether that succeeds (step 66) by increasing the RF signal strength above threshold 2. If it succeeds, the controller updates its RF environment model (step 80) and continues the mission within its new RF constraints (return to step 54). If it does not succeed, but other postulated new positions remain (i.e., n<n_max), the controller directs the UAV to fly to the next postulated position. This repeats until all postulated positions are exhausted. If none of them succeeds, the controller executes a user-specified preplanned operation (step 60).

Returning now to the diagnostic testing of whether received power is greater than threshold 2 (see step 62), if the answer is yes, then this means the UAV is receiving a sufficiently strong signal, but cannot make sense of it. The presumption is that some strong RF signal is garbling the operator's signal. In other words, the signal is jammed. (This is not necessarily hostile jamming. For example, someone on the ground may be operating an electrical device with its metal casing removed, not realizing that the device emits strong RF interference when it is unshielded.)

The response to jamming may comprise several steps. In step 68, different frequencies are selected for the RF receiver. After each selection, the controller determines whether the change in frequency has avoided the jamming (step 70). If the frequency change succeeds, the controller updates its RF environment model (step 80) to include the location, frequency, and observed strength of the jamming signal. It then continues its nominal mission within the new RF constraints (return to step 54).

If changing frequencies does not succeed, the controller tries various other strategies. For example (step 72), it may reorient the UAV in an attempt to use the UAVs body to shield the antenna from the jamming signal. As with the response to an antenna failure, the controller can use its RF environment model and its geometry engine to postulate several new orientations that might restore the signal. The controller tries each of them in turn until it achieves success (step 74) and updates the RF environment model (step 80), or exhausts all postulated orientations. If it does not succeed, but other postulated new orientations remain (i.e., m<m_max), the controller directs the UAV to adopt the next postulated orientation. This repeats until all postulated positions are exhausted.

If it exhausts all postulated orientations, then the controller postulates new locations to try (step 76). To do this, it uses its RF environment model (which can include a terrain/urban map and a $1/R^4$ propagation model for electromagnetic waves near the Earth's surface), together with the observed jamming strength at the UAV's current location, to postulate locations where the jamming signal might be blocked by buildings or terrain, or where distance from the jammer makes it too weak to be effective. It flies to each location on the list, trying each in turn. If it does not succeed, but other postulated new locations remain (i.e., p<p_max), the controller directs the UAV to fly to the next postulated location. This repeats until all postulated locations are exhausted. If the controller succeeds in restoring connectivity to the operator, it updates the RF environment model (step 80) and continues its mission (return to step 54). If not, the controller executes a user-specified preplanned operation (step 60).

The above discussion of the logic schematically depicted in FIG. 3 uses a communications failure as an example, i.e., the UAV loses connectivity with the operator. A similar chain of logic applies if the UAV loses connectivity with navigation signals, e.g., from a GPS.

Figure 4:
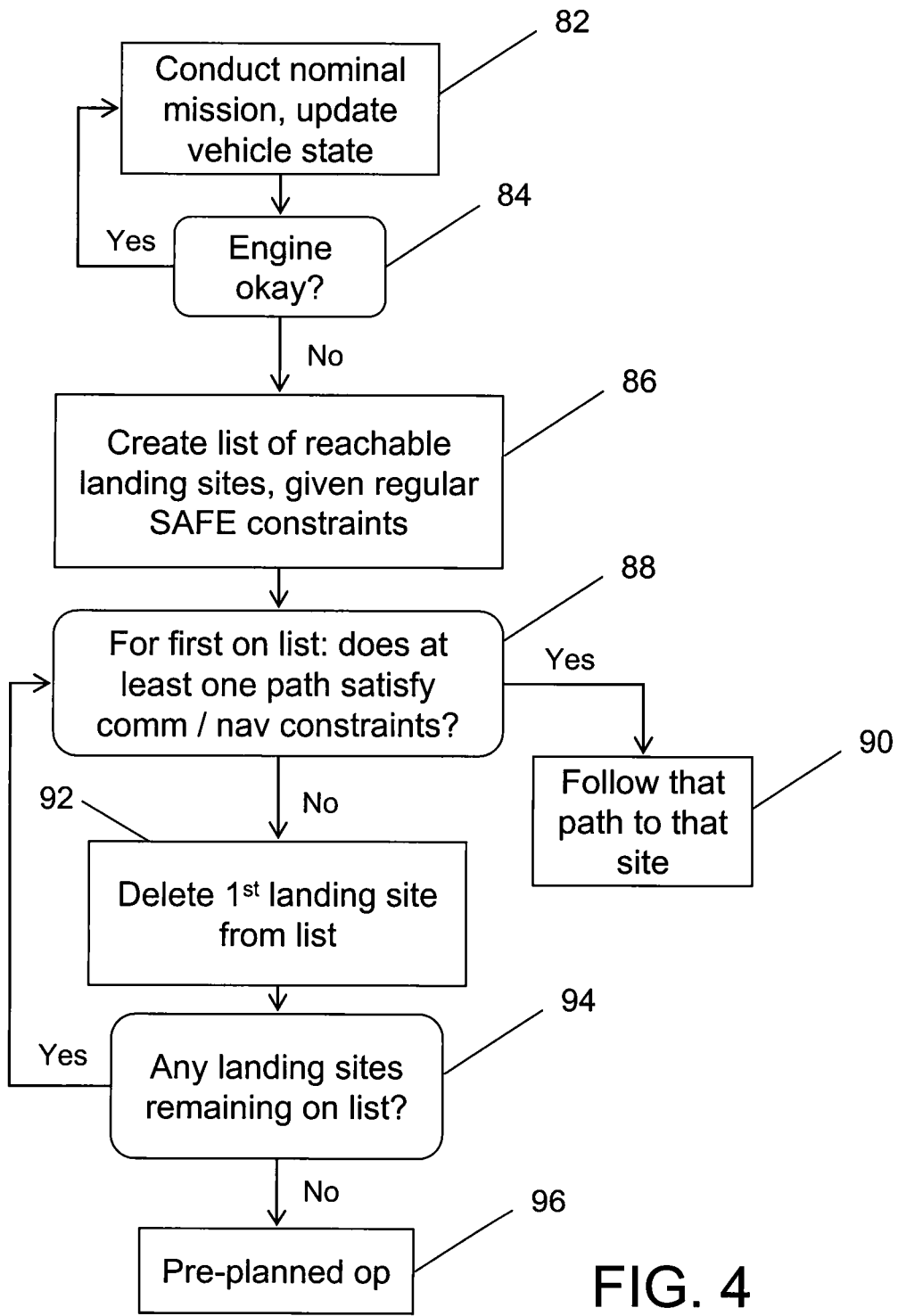
FIG. 4 is a flowchart showing steps of an algorithm for maintaining access to communication and navigation signals in response to engine or flight control failure.

FIG. 4 shows how the enhanced UAV control system responds to failure of an engine or a flight-critical part of the airframe. The top three blocks 82, 84, 86 and the bottom block 96 summarize the "preprogrammed behaviors" strategy known in the prior art. The remaining steps have been added to provide an enhanced UAV control system. In particular, the enhanced UAV control system in accordance with the embodiment shown in FIG. 4 adds communication/navigation constraints to engine-out path selection.

In step 82, the UAV performs nominal mission functions. The onboard control system directs these functions and keeps track of the vehicle state, i.e., location, speed, fuel level, etc.

In step 84, the onboard control system checks whether the engine still works well enough to continue flight. If yes, the control system continues to guide the UAV through its nominal mission (return to step 82). If no, the control system runs the in-flight planning part of the safe area flight emergency program disclosed in U.S. Patent Appln. Publ. No. 2011/0264312 A1 (which disclosure is incorporated by reference herein in its entirety), or equivalent software, to generate a list of physically reachable landing sites and the flight path(s) to each of them (step 86). Unlike the prior art, the enhanced UAV control system disclosed herein does not simply pick one of these paths and fly it; instead, it performs a communication/navigation constraint check (step 88).

In the communication/navigation constraint block 88, the controller considers the first landing site on the list. If at least one path from the current location to the landing site satisfies all the constraints on communication and navigation, then the controller follows that path to the landing site (step 90). If not, the controller deletes that landing site from consideration (step 92). A determination is then made whether any more landing sites remain on the list (step 94). If yes, the controller checks whether the next one satisfies the constraints (return to step 88), and so on. If none of the physically reachable landing sites can be reached by a path that satisfies the communication and navigation constraints, then the controller executes a user-selected preplanned operation (step 96), which is typically some sort of ditching.

Here are some examples of constraints the system may apply in choosing a landing site.

1) Communications connectivity at required positions between the current position (where the contingent situation occurred) to the landing site. Communications in many cases require line-of-sight to an antenna on the ground. The invention uses terrain data and terrain masking algorithms to check whether points along a descent path have adequate connectivity. Communication also requires no jamming (intentional or otherwise). The UAV control system uses data about known or suspected jammers (including commercial radio towers) and any encounters with jammers in the present flight. Data about terrain and jammers is included in the RF environment model.

2) Navigation signal reception (e.g., GPS) at required positions between the current position (where contingency operations begin) to the landing site. Navigation receivers require line-of-sight to sufficient numbers of navigation aids such as GPS and WAAS satellites. The UAV control system uses predicted satellite positions, terrain data, and terrain masking algorithms to check whether points along a descent path have adequate reception of navigation signals.

In accordance with one embodiment, the UAV control system chooses a landing site and descent path where every point along the path gives the aircraft clear line-of-sight to the minimum number of navigation transmitters (e.g. GPS satellites) needed for navigation. The number is typically four if navigation is based entirely on GPS, or three if the aircraft has a barometric altimeter.

In a more sophisticated embodiment, the UAV control system may have information about: (1) required navigation precision at various altitudes or distances from obstacles; and (2) the navigation precision achievable using dead reckoning, visual cues, inertial measurements, or other information available to the aircraft (or its operator, for segments of the descent path that have connectivity to the operator).

In this embodiment, the invention may choose a descent path where at least some points along the path do not provide line-of-sight to the minimum number of transmitters, but where line-of-sight to enough transmitters is available, not only at points where high precision is required, but also for a long enough interval preceding those points for the navigation receiver to acquire the navigation signals and synchronize to them.

For communications connectivity constraints, one embodiment of the UAV control system chooses a landing site and descent path where every point along the path gives the aircraft clear line-of-sight to at least one antenna linked to the operator of the UAV.

In a more sophisticated embodiment, the control system may use information about phases of flight where communication is not required to choose a descent path where at least some points along the path do not provide line-of-sight to the antenna, but where line-of-sight to the antenna is available at points where communication is required. As an example, the invention may have identified an old airfield as a possible landing site, but the user has added a constraint that the aircraft can only land where visual observation by the operator confirms that no people are in the way. The control system knows that the video camera onboard the UAV cannot resolve humans from distances greater than 1 mile, so it does not require communication to be available during parts of the descent more than 1 mile from the old airfield. However, it chooses a descent path where the aircraft has line-of-sight to an antenna as soon as the aircraft comes within a mile of the airfield. This enables the operator to use the camera to visually examine the proposed landing site. (If it turns out there are people on the airfield, the operator may command the vehicle to ditch in a safe location.)

The above discussion of the logic schematically depicted in FIG. 4 uses an engine failure as an example. The UAV control system follows a similar chain of logic if the UAV is unable to return to its launch site for some other reason, e.g., an aileron breaks loose and creates too much drag to return home on current fuel.

In accordance with one embodiment, the initial mission plan includes communication/navigation constraint satisfaction. Any new mission will take the UAV to places and/or times outside the cases where constraint satisfaction has been checked. Instead of doing a total replan with communication/navigation constraint satisfaction, which would require a CPU and lots of data, the UAV will start flying toward the new waypoint. Along the way, the UAV control system detects when/where constraints are threatened or violated and takes action to recover.

Figure 5:
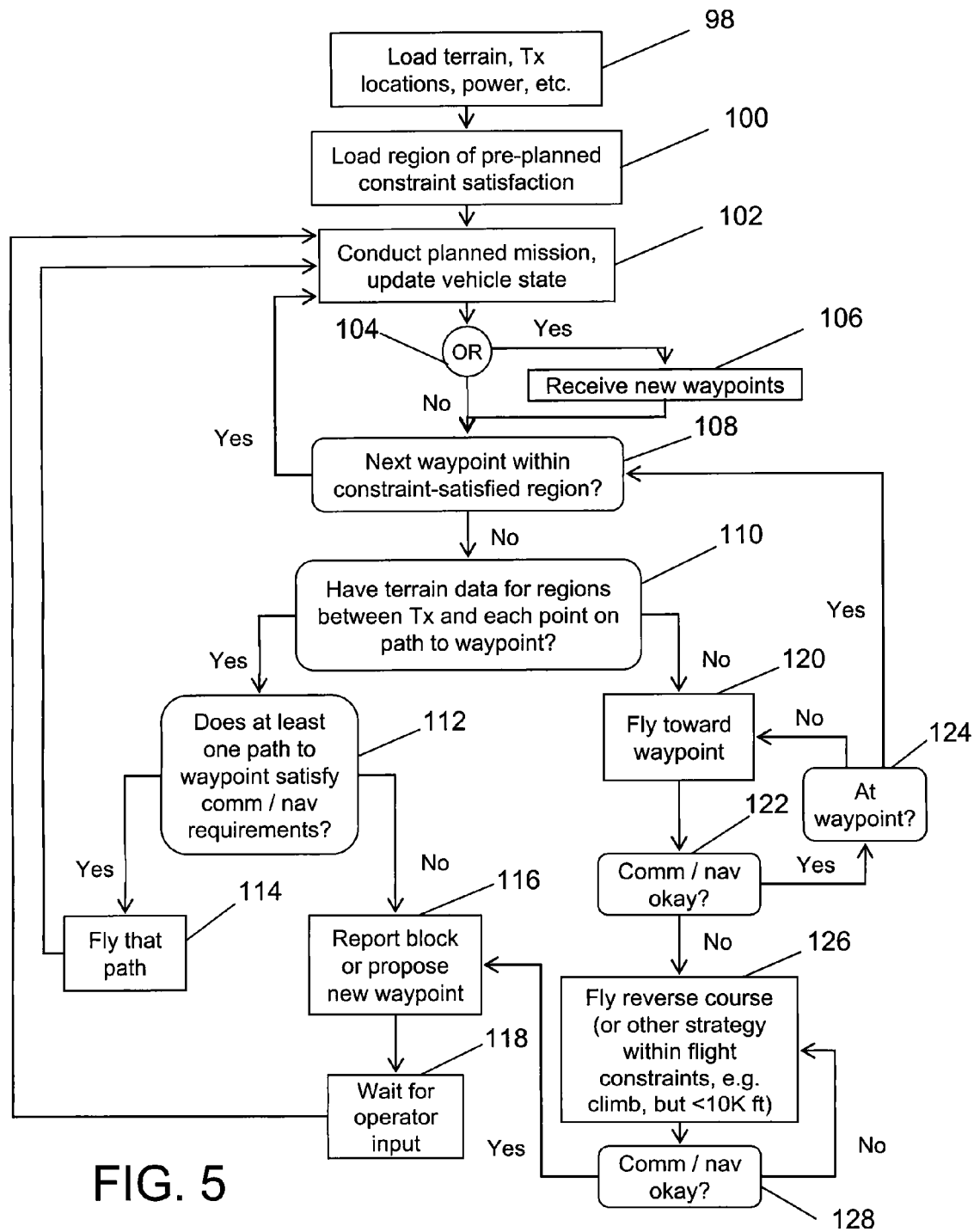
FIG. 5 is a flowchart showing steps of an algorithm for maintaining access to communication and navigation signals in response to a command to execute an unplanned mission segment.

FIG. 5 shows in greater detail how the enhanced UAV control system responds to a command to execute an unplanned mission segment (i.e., change of mission). In step 98, the RF environment model is loaded before flight with RF-related information about the expected area of mission operations. Although large aircraft can carry extensive data for a wide variety of mission contingencies, small UAVs are much more limited in their onboard storage capacity; they typically carry only enough for the planned mission and perhaps one or two most likely contingencies.

In step 100, a region of preplanned constraint satisfaction is loaded into the control system. This software module defines nominal mission waypoints that are known to satisfy communication/navigation constraints (and other constraints) as a result of preflight planning and analysis. It also defines the spatial and temporal boundaries within which the constraints remain satisfied.

During step 102 shown in FIG. 5, the UAV is in flight and the controller is executing the nominal mission. While flying the mission, the controller may sometimes receive new commands, i.e. new waypoints, from the operator. In step 104, the controller determines whether a new waypoint has been received. If yes, then the controller adds that new waypoint to its flight plan (step 106) and then proceeds to step 108. If no, then step 106 is not performed and the controller proceeds directly to step 108.

Each time the UAV leaves a current waypoint for the next waypoint, the controller determines whether the next waypoint is within the region of preplanned constraint satisfaction (step 108). If the next waypoint and the path toward it lie within the region of preplanned constraint satisfaction, then the controller flies there. If not, then the controller considers whether its RF environment model includes information about the path (step 110). More specifically, the controller determines whether the RF environment model includes terrain data for regions between the transmitter of interest and each point along the flight path to the next waypoint.

If the controller has RF environment data about the path, then the controller checks whether the path to the next waypoint satisfies the communication/navigation constraints (step 112). If it does, then the controller flies that path (step 114). If not, then the controller either tells the operator that it cannot fly in that direction (step 116) and waits for further instructions (step 118) or, in a more sophisticated embodiment, it may propose a new waypoint near the next waypoint (step 116) and then return to step 102. The controller is programmed to propose a waypoint that will allow the UAV to satisfy constraints while moving in the desired direction.

If in step 110, the controller determines it does not have RF environment data about the path, then the controller begins flying toward the next waypoint (step 120), but while it flies, it checks whether onboard communication/navigation receivers are receiving the needed signals (step 122). If the needed signals are being received, then the controller determines whether the UAV has arrived at the target waypoint yet (step 124). If not, then the UAV continues to fly toward that waypoint (step 120). If yes, then the controller returns to step 108, i.e., processes the next waypoint in its flight plan.

If the UAV encounters a problem with the communication signal (while performing step 122 in FIG. 5), then it cannot immediately communicate with the operator. It therefore executes a user-selected strategy to get back in communication. An example strategy is to reverse course (step 126) until communication is restored (as determined in step 128) and then report the problem to the operator (step 116). Other strategies are possible, e.g., climb to higher elevation while remaining below some user-selected ceiling (e.g., 1000 ft). If after execution of a strategy in step 126, the controller determines in step 128 that the communication/navigation receivers are still not receiving the needed signals, the process returns to step 126, i.e., the controller tries a different strategy.

The benefits provided by the enhanced UAV control system described above include at least the following:

(1) It is known in the prior art to provide the UAV operator with the capability to manual select a landing site (or other path) in real-time. However, terrain masking is a complex geometry problem with three-dimensional features (like radio shadows) that are invisible to the eye. Human operators, especially under stress, have difficulty estimating how well a possible flight path skirts the boundaries of radio shadows. The enhanced UAV control system described above uses more reliable computational methods to select a landing site (or other path). Also, for an encounter with jamming, no radio link to an operator is available, so manual selection is impossible. The enhanced UAV control system proceeds without a radio link.

(2) In a known system for managing a safe area flight emergency, sometimes the prior system recommends landing sites and descent paths that are kinematically reachable, but which could lead to an undesirable outcome because the operator prematurely loses communication with the controller or loses navigation signals that are required to reach the recommended landing site. The enhanced UAV control system disclosed above avoids or mitigates these problems.

(3) The prior art solution providing a pre-programmed response relies on navigation when communication is lost and is inflexible. Depending on the cause of lost communication and the location where it occurs, the preprogrammed response may not save the UAV. The "lost GPS" response is usually "climb"; this is unsafe if other aircraft are nearby or not possible if the UAV is already at its flight ceiling or if the engine fails. The enhanced UAV control system uses the knowledge encoded in the RF environment model and the geometry engine, plus knowledge discovered by in-flight testing of postulated fixes, to make more versatile and effective responses.

While UAV control systems have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used in the claims, the term "computer system" should be construed broadly to encompass a system having at least one computer or processor, and which may have two or more autonomous computers or processors that communicate through a network or bus.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently.

The invention claimed is:

1. A method for controlling an unmanned aerial vehicle in response to an in-flight contingency, comprising:
    performing operations by a computer system onboard the unmanned aerial vehicle, including:
    (a) determining whether a current flight path of the unmanned aerial vehicle should be changed;
    (b) determining a different flight path of the unmanned aerial vehicle which satisfies signal reception constraints in response to a determination that the current flight path should be changed; and
    (c) controlling the unmanned aerial vehicle to fly said different flight path.

2. The method as recited in claim 1, wherein said signal reception constraints are communication or navigation constraints.

3. The method as recited in claim 1, wherein a destination of said different flight path is an emergency landing site.

4. The method as recited in claim 1, wherein a destination of said different flight path is a new waypoint not included in a planned mission of the unmanned aerial vehicle.

5. The method as recited in claim 1, wherein step (b) comprises using an RF environment model and a geometry engine to determine a different location for the unmanned aerial vehicle to fly to, said different location being calculated to reduce effects of jamming.

6. The method as recited in claim 5, further comprising updating said RF environment model if connectivity to the operator is restored due to said different location.

7. A method for controlling an unmanned aerial vehicle in response to an in-flight contingency, the method comprising:
    performing operations by a computer system onboard the unmanned aerial vehicle, including:
    (a) determining whether signal reception conditions dictate that a current orientation of the unmanned aerial vehicle should be changed;
    (b) determining a different orientation of the unmanned aerial vehicle which satisfies signal reception constraints in response to a determination that the current orientation should be changed; and
    (c) controlling the unmanned aerial vehicle to reorient to a selected different orientation.

8. The method as recited in claim 7, wherein said signal reception constraints are communication or navigation constraints.

9. The method as recited in claim 7, wherein step (a) comprises:
    (d) determining whether an onboard receiver is receiving adequate signals; and
    (e) if the computer system determines in step (d) that the receiver is not receiving adequate signals, determining whether a received power is greater than a first predefined threshold.

10. The method as recited in claim 9, wherein step (b) comprises using an RF environment model and a geometry engine to determine said different orientation of the unmanned aerial vehicle, said different orientation being calculated to improve signal reception.

11. The method as recited in claim 10, further comprising updating said RF environment model if connectivity to the operator is restored due to said different orientation.

12. The method as recited in claim 10, wherein in response to a determination that the received power is less than a second predefined threshold, the unmanned aerial vehicle is reoriented so that a different antenna is pointing toward an operator.

13. The method as recited in claim 12, wherein in response to a determination that the received power is greater than said first predefined threshold and less than said second predefined threshold, the unmanned aerial vehicle is reoriented so that its body shields an antenna from a jamming signal.

14. A method for controlling an unmanned aerial vehicle in response to an in-flight contingency, the method comprising:
    performing operations by a computer system onboard the unmanned aerial vehicle, including:
    (a) determining whether a flight-critical component of the unmanned aerial vehicle is operating well enough to continue flight;
    (b) creating a list of reachable landing sites in response to a determination that the flight-critical component is not operating well enough to continue flight;
    (c) determining whether at least one path to at least one of the reachable landing sites satisfies signal reception constraints; and
    (d) controlling the unmanned aerial vehicle to follow said at least one path.

15. The method as recited in claim 14, wherein said signal reception constraints are communication or navigation constraints.

16. A system for controlling an unmanned aerial vehicle in response to an in-flight contingency, comprising:
    a computer system and computer memory storing an RF environment model;
    a geometric engine; and
    RF constraint logic,
    wherein the computer system is configured to perform operations in accordance with a first routine of said RF constraint logic, including:
    determining whether a current flight path of the unmanned aerial vehicle should be changed;
    determining a different flight path of the unmanned aerial vehicle which satisfies signal reception constraints using said RF environment model and said geometry engine in response to a determination that the current flight path should be changed; and
    controlling the unmanned aerial vehicle to fly a selected different flight path.

17. The system as recited in claim 16, wherein said signal reception constraints are communication or navigation constraints.

18. The system as recited in claim 16, wherein said computer system is further capable of performing operations in accordance with a second routine of said RF constraint logic including:

determining whether signal reception constraints dictate that a current orientation of the unmanned aerial vehicle should be changed;

determining a different orientation of the unmanned aerial vehicle which satisfies said signal reception constraints using said RF environment model and said geometry engine in response to a determination that the current orientation should be changed; and controlling the unmanned aerial vehicle to reorient to a selected different orientation.

19. The system as recited in claim 18, wherein said signal reception constraints are communication or navigation constraints.

20. A system for controlling an unmanned aerial vehicle in response to an in-flight contingency, comprising:

a computer system and computer memory storing an RF environment model;

a geometric engine; and

RF constraint logic, said computer system being capable of performing operations in accordance with said RF constraint logic, including:

determining whether a flight-critical component of the unmanned aerial vehicle is operating well enough to continue flight;

creating a list of reachable landing sites in response to a determination that the flight-critical component is not operating well enough to continue flight;

determining whether at least one path to at least one of the reachable landing sites satisfies signal reception constraints using said RF environment model and said geometry engine; and controlling the unmanned aerial vehicle to follow said at least one path.

\* \* \* \* \*